United States Patent
Plummer et al.

(10) Patent No.: US 12,059,853 B2
(45) Date of Patent: Aug. 13, 2024

(54) NET SHAPE FORMING OF COMPOSITE STRINGERS CONTAINING OUT-OF-PLANE FEATURES

(71) Applicant: The Boeing Company, Chicago, IL (US)

(72) Inventors: Steven Joseph Plummer, Seattle, WA (US); Kurtis Shuldberg Willden, Kent, WA (US); Andrew Elmer Modin, Charleston, SC (US); Raviendra S. Suriyaarachchi, Kirkland, WA (US); Megan E. Bliss, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/447,595

(22) Filed: Sep. 14, 2021

(65) Prior Publication Data
US 2022/0080683 A1   Mar. 17, 2022

Related U.S. Application Data

(60) Provisional application No. 63/079,816, filed on Sep. 17, 2020.

(51) Int. Cl.
| | | |
|---|---|---|
| *B29C 70/54* | (2006.01) | |
| *B29C 70/34* | (2006.01) | |
| *B29C 70/46* | (2006.01) | |
| *B29L 31/30* | (2006.01) | |

(52) U.S. Cl.
CPC ............. *B29C 70/54* (2013.01); *B29C 70/34* (2013.01); *B29C 70/461* (2021.05); *B29C 70/462* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 2,484,288 A | 10/1949 | Hamm | |
| 4,548,859 A | 10/1985 | Kline et al. | |
| 5,378,134 A | 1/1995 | Blot et al. | |
| 7,357,166 B2 * | 4/2008 | Pham | B29C 70/345 156/581 |
| 8,465,613 B2 | 6/2013 | Rotter et al. | |
| 8,557,165 B2 | 10/2013 | Jones et al. | |

(Continued)

FOREIGN PATENT DOCUMENTS

| | | | | |
|---|---|---|---|---|
| EP | 1393875 A1 | 3/2004 | | |
| EP | 2170699 B1 * | 2/2012 | ............. | B29C 70/30 |

(Continued)

OTHER PUBLICATIONS

EPO. "European Search Report for EP 3970955 A1". EPO. Espacenet. 2023 (Year: 2023).*

(Continued)

*Primary Examiner* — Farah Taufiq
*Assistant Examiner* — Jonathan B Woo
(74) *Attorney, Agent, or Firm* — Yee & Associates, P.C.

(57) ABSTRACT

A tool is configured to form a composite charge into a stringer having a net shape with at least one out-of-place feature. The out-of-plane feature is formed by a shim removably attached to the tool. A family of the shims may be used to form a range of out-of-plane features having varying characteristics.

20 Claims, 11 Drawing Sheets

(56) References Cited

U.S. PATENT DOCUMENTS

| | | | |
|---|---|---|---|
| 8,997,642 | B2 | 4/2015 | Stewart et al. |
| 9,162,396 | B2 | 10/2015 | Coxon et al. |
| 9,272,767 | B2 | 3/2016 | Stewart |
| 9,387,628 | B2 | 7/2016 | Chapman et al. |
| 9,782,960 | B1 | 10/2017 | Roins et al. |
| 10,315,750 | B2 | 6/2019 | Stewart |
| 10,369,740 | B2 | 8/2019 | Chapman et al. |
| 10,399,283 | B2 | 9/2019 | Offensend et al. |
| 10,456,960 | B2 | 10/2019 | Chapman et al. |
| 11,760,040 | B2 * | 9/2023 | Plummer .............. B29C 70/462 156/245 |
| 2004/0043196 | A1 | 3/2004 | Willden et al. |
| 2010/0102482 | A1 | 4/2010 | Jones et al. |
| 2010/0225016 | A1 * | 9/2010 | Prebil ................ B29D 99/0003 425/195 |
| 2011/0127698 | A1 | 6/2011 | Alenby et al. |
| 2013/0092323 | A1 * | 4/2013 | Pham .................... B29C 33/76 156/256 |
| 2013/0340928 | A1 * | 12/2013 | Rotter ................... B29C 53/04 425/363 |
| 2014/0103585 | A1 | 4/2014 | Coxon et al. |
| 2014/0314996 | A1 | 10/2014 | Stewart |
| 2016/0016366 | A1 * | 1/2016 | Robins ................. B29C 70/46 425/356 |
| 2016/0023409 | A1 | 1/2016 | Coxon et al. |
| 2016/0339682 | A1 | 11/2016 | Bahe et al. |
| 2017/0021534 | A1 | 1/2017 | Chapman et al. |
| 2017/0057100 | A1 * | 3/2017 | Shaw ................. B29D 99/0014 |
| 2017/0095986 | A1 | 4/2017 | Feigenblum et al. |
| 2019/0291306 | A1 | 9/2019 | Hannan et al. |
| 2020/0231267 | A1 | 7/2020 | Rotter et al. |
| 2021/0107238 | A1 | 4/2021 | Saini et al. |
| 2021/0107239 | A1 | 4/2021 | Saini et al. |
| 2022/0080649 | A1 | 3/2022 | Plummer et al. |
| 2022/0080680 | A1 | 3/2022 | Plummer et al. |

FOREIGN PATENT DOCUMENTS

| | | |
|---|---|---|
| EP | 3115185 A1 | 1/2017 |
| EP | 3162544 A1 | 5/2017 |
| EP | 3628472 A1 | 4/2020 |
| EP | 3677397 A1 | 7/2020 |
| EP | 3693155 A1 | 8/2020 |
| EP | 3708347 A1 | 9/2020 |

OTHER PUBLICATIONS

European Patent Office Extended Search Report, dated Feb. 11, 2022, regarding EP Application No. 21192330.5, 6 pages.
European Patent Office Extended Search Report, dated Dec. 1, 2021, regarding EP Application No. 21180643.5, 8 pages.
European Patent Office Extended Search Report, dated Dec. 17, 2021, regarding EP Application No. 21183660.6, 8 pages.
Office Action, dated Feb. 17, 2023, regarding U.S. Appl. No. 17/447,591, 19 pages.
Final Office Action, dated Feb. 21, 2023, regarding U.S. Appl. No. 17/447,593, 9 pages.
Office Action, dated Nov. 29, 2022, regarding U.S. Appl. No. 17/447,593, 28 pages.
Notice of Allowance, dated Jun. 20, 2023, regarding U.S. Appl. No. 17/447,591, 24 pages.
Office Action dated Mar. 21, 2024, regarding U.S. Appl. No. 18/306,432, 31 pages.

\* cited by examiner

NET SHAPE FORMING OF COMPOSITE STRINGERS CONTAINING OUT-OF-PLANE FEATURES

RELATED PROVISIONAL APPLICATION

This application claims the benefit of U.S. Provisional Patent Application Ser. No. 63/079,816, filed Sep. 17, 2020, and entitled "Net Shape Forming of Composite Stringers Containing Out-Of-Plane Features;" which is incorporated herein by reference in its entirety.

BACKGROUND INFORMATION

1. Field

The present disclosure generally relates to the production of composite parts, and deals more particularly with a method and apparatus for making composite stringers containing out-of-plane features such as joggles.

2. Background

Composite stringers are used in aircraft and other applications as to stiffen and transfer loads on outer skins. In some cases, a stringer must be contoured along its length and/or contain out-of-plane features such as joggles. These features make the production of composite stringers more challenging due to stress concentrations that are generated when forming these features.

One technique for producing composite stringers having out-of-plane features such as joggles involves the use of a punch to form a flat composite charge into a die. After the stringer is formed to the desired cross-sectional shape by the punch, it is transferred to a forming die in a kitting tray where out-of-plane features such as joggles are formed in the stringer. Forming the joggles in this manner tends to produce stress concentrations that can cause undesired ply wrinkling and/or resin pooling which may affect stringer performance. Consequently stringers containing these non-conformities must be reworked and sometimes must be discarded.

Accordingly it would be desirable to provide a stringer production method and equipment that reduces stringer wrinkling and resin pooling by forming the stringer to net shape.

SUMMARY

The disclosure relates in general to the production of composite stringers, and more specifically to production processes and equipment for making composite stringers having out-of-plane features.

According to one aspect, apparatus is provided for making a composite stringer having at least one out-of-plane feature therein. The apparatus includes a die including a die cavity, and a tool configured to form a composite charge into the die cavity. The apparatus also includes a shim attached to the tool. The shim is configured to form an out-of-plane feature in the composite stringer as tool forms the composite charge into the die cavity.

According to another aspect, apparatus is provided for making a composite stringer. The apparatus includes a punch, a die into which a composite charge may be formed by the punch, and a family of shims. The shims are respectively configured to form differing features in the composite charge. Each of the shims is releasably attached to the punch, allowing a single punch to be configured to produce stringers having differing features.

According to a further feature, a method is provided of making a composite stringer to net shape having an out-of-plane feature. The method includes installing a shim on a tool, and forming a composite charge into a composite stringer using the tool. The forming includes using the shim to form an out-of-plane feature in the composite charge as the composite charges being formed by the tool.

One of the advantages of the disclosed embodiments is that composite stringers having one or more out-of-plane features such as joggles can be formed to net shape in a single forming operation. Another advantage is that composite stringers can be formed to net shape with reduced wrinkling and resin pooling. Another advantage is that secondary forming operations previously needed to produce out-of-plane features in the stringers can be eliminated. A further advantage is that composite stringers can be produced with various out-of-plane features using a family of shims that adapt a single forming tool to form these features. Another advantage is that the number of tools required to produce composite stringers with differing features is reduced, thereby reducing flow times and saving material and labor costs. A still further advantage is that stringers with out-of-plane features can be produced that exhibit higher quality, and the need for stringer rework is reduced.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figures 1, 2:
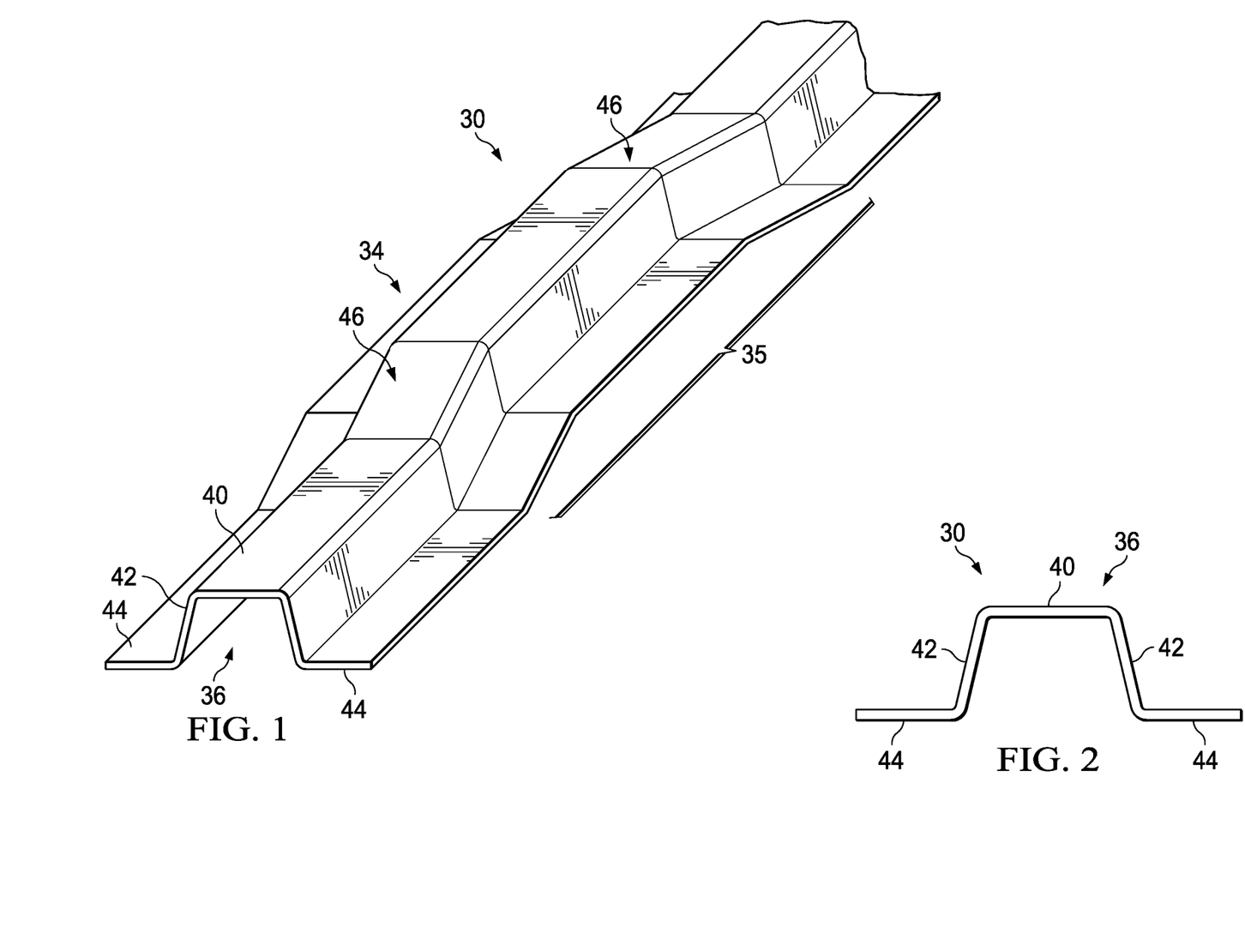
FIG. 1 is an illustration of a perspective view of a composite hat stringer having an out-of-plane feature.
FIG. 2 is an illustration of an end view showing the cross-sectional shape of the stringer of FIG. 1.

Referring first to FIGS. 1 and 2, a composite stringer 30 comprises a composite laminate of fiber reinforced plies of a polymer such as a thermoset or thermoplastic. In the illustrated example, the composite stringer 30 is a hat stringer comprising a hat section 36 and a pair of outwardly extending flanges 44. The hat section 36 comprises a cap 40 connected to the flanges 44 by a pair of inclined sides 42, sometimes referred to as webs. Although the disclosed embodiments will be described in connection with a hat shaped stringer, principles of the disclosed embodiments may be employed to produce composite stringers having any of a wide variety of cross-sectional shapes.

Figure 3:
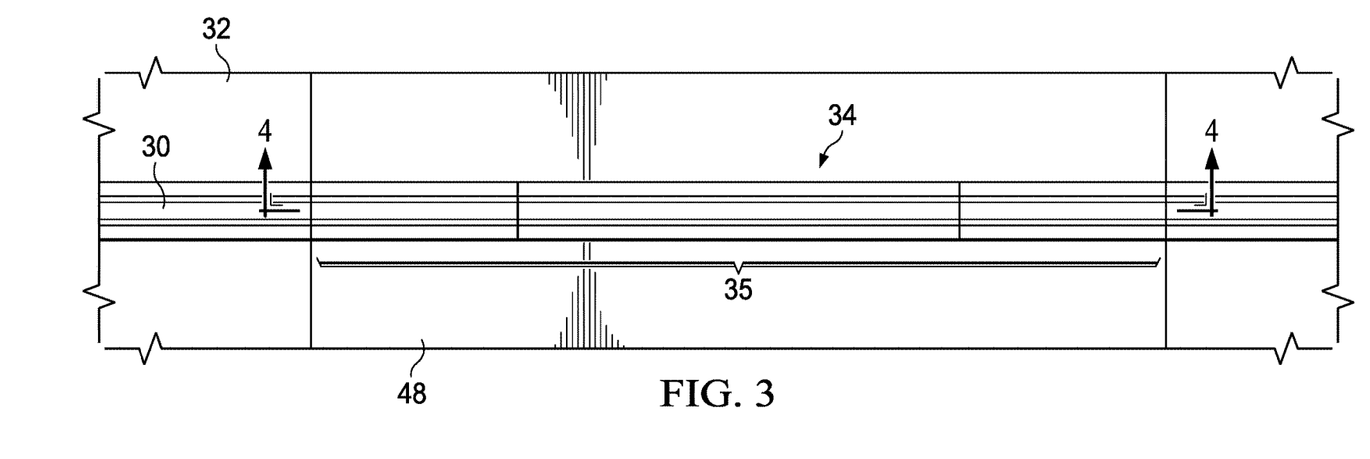
FIG. 3 is an illustration of a top plan view of a composite hat stringer attached to a skin.
Figure 4:
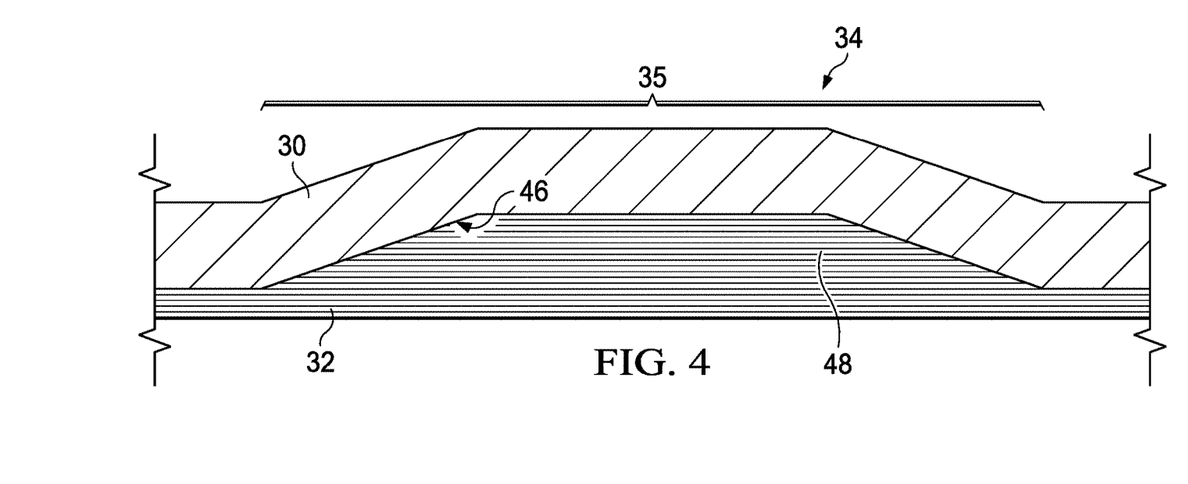
FIG. 4 is an illustration of a sectional view taken along the line 4-4 in FIG. 3.

Referring particularly to FIGS. 1, 3 and 4, the composite stringer 30 includes one or more out-of-plane features 34 along its length. In the illustrated example, the out-of-plane feature 34 is a joggle 35 comprising a ramp-up/ramp-down 46 in the cross-sectional shape of the composite stringer 30 along its length. However, the joggle 35 is merely illustrative of a wide range of possible out-of-plane features 34 in the composite stringer 30 that may be required in a particular application. In the illustrated example, the composite stringer 30 is attached to a skin 32 by any suitable technique such as co-curing, bonding or fasteners. The skin 32 includes a pad-up 48 of composite plies 50 that may be required to locally strengthen an area of the skin 32, or for other reasons. The joggle 35 bridges over the pad-up 48 and has a length and contour that closely matches the cross-sectional shape of the pad-up 48. Although the composite stringer 30 is shown with only one joggle 35 therein, depending on the application, it may have any number of joggles 35 of the same or differing profiles in order to accommodate a variety of features present on the skin 32, or other conditions.

Figure 5:
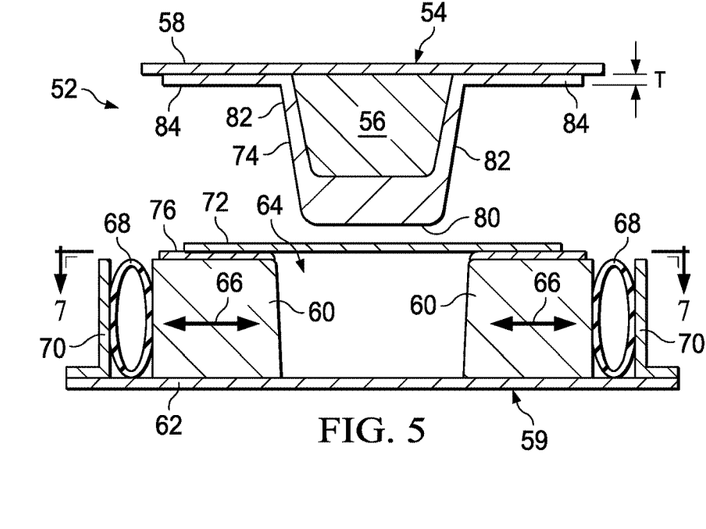
FIG. 5 is an illustration of a cross-sectional view of a toolset used to punch form the composite stringer of FIG. 1.
Figure 6:
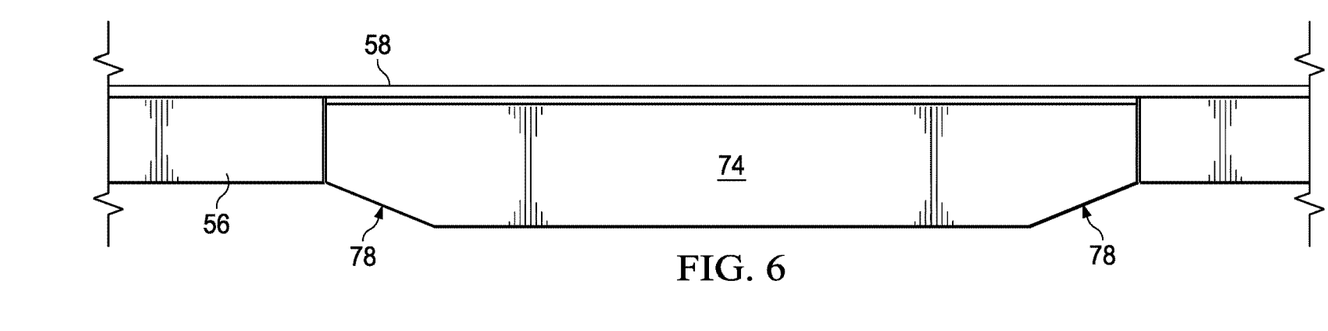
FIG. 6 is an illustration of a fragmentary, side view of a punch forming part of the toolset shown in FIG. 5.
Figure 7:
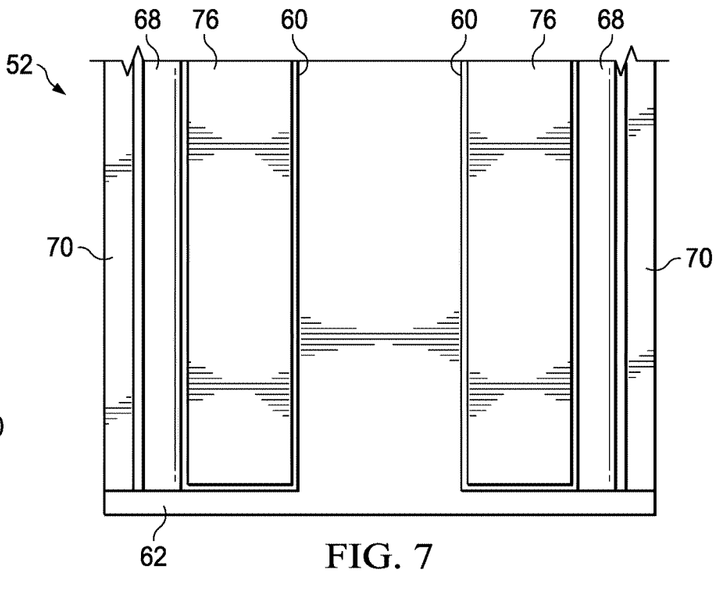
FIG. 7 is an illustration of a sectional view taken along the line 7-7 in FIG. 5.

FIGS. 5-7 illustrate a toolset 52 for forming a composite charge 72 into a composite stringer 30 having a joggle 35 therein. The toolset 52 comprises a tool 54, which in this example is a punch 56, and a die 59 comprising a pair of die sections 60 that are spaced apart to form a die cavity 64. The punch 56 may be formed of a flexible material, such as an elastomer, nylon or PTFE (polytetrafluoroethylene) to name only a few, allowing it to flex as required. In the illustrated example, the punch is mounted on the bottom of a top plate 58 that is flexible and may comprise, for example and without limitation, sheet aluminum. In other examples, however, the top plate 58 may also be an elastomer or other polymer that is integrally formed with the punch 56. The cross sectional shape of the punch 56 substantially matches the IML (inner mold line) of the hat section 36 (FIG. 2) of the composite stringer 30.

The die sections 60 are mounted for lateral movement 66 on a bottom plate 62. In one example, the die sections 60 comprise a series of interconnected die blocks that permit the die sections 60 to flex out-of-plane. A pair of side plates 70 are secured to the bottom plate 62, outboard of the dies 60. Inflatable side bladders 68 are respectively located between the dies 60 and the side plates 70. The side bladders 68 may be inflated with a fluid such as air, and function to control the outward lateral movement of the dies 60 during the forming process. The toolset 52 may be installed in a press (not shown) which move the top and bottom plates 58, 62 relative to each other, causing displacement of the punch 56 into the die cavity 64 at a desired rate and with a desired amount of force.

In the illustrated example, the punch 56 is substantially straight along its length. However, in other examples discussed below, the punch 56 may have one or more curvatures along its length. In order to form the joggle 35 or other out-of-plane feature 34 in the composite stringer 30, a shim 74 is installed over the punch 56 which has a surface profile substantially matching the joggle 35. The shim 74 may be releasably attached to the punch 56 and/or the top plate 58 by any suitable means, such as by double-sided tape, a mechanical latch (not shown) or a later discussed magnetic latch. Thus differently shaped shims 74 may be interchangeably installed on the same punch 56 to form different out-of-plane features. Depending on the application it may be necessary to also install shims 76 on top of the die sections 60.

The shim 74 includes a cap 80, sides 82 and flanges 84 which form a profile substantially matching the IML of the joggle 35. The thickness T, as well as other dimensions or features of the shim 74 will depend on the application, and the geometry/dimensions of the joggle 35. The shim 74 includes ramp-up/ramp-downs 78 at its outer ends which form smooth transitions between the shim 74 and the body of the punch 56. The shim 74 may be formed of any suitable material by any of various manufacturing processes. For example, the shim 74 may comprise laser sintered nylon or photo-cured epoxy produced by 3-D printing. Although only a single shim 74 is illustrated in the drawings, any number of shims 74 may be installed at any location along the length of the punch 56 to form corresponding out-of-plane features in the composite stringer 30.

A stringer forming operation begins with the toolset 52 arranged as shown in FIG. 5, and the punch 56 in a raised position. A composite charge 72, which in this example is flat, is placed on top of the die sections 60, spanning the die cavity 64. To form the composite charge 72 into the desired cross sectional shape of the composite stringer 30, the top plate 58 moves down, causing the punch 56 to form the composite charge 72 into the die cavity 64. As the punch 56 forms the composite charge 72 into the cross-sectional shape of the composite stringer 30, the shim 74 also forms the joggle 35 or other out-of-plane feature in the composite stringer 30. Thus, the out-of-plane feature 34 is formed in the stringer 30 at the same time the stringer 30 is formed to the desired cross sectional shape. Simultaneous forming of the stringer 30 and the out-of-plane features 34 reduces strain in the stringer 30 during the forming process which can cause wrinkling and resin pooling.

Figure 8:
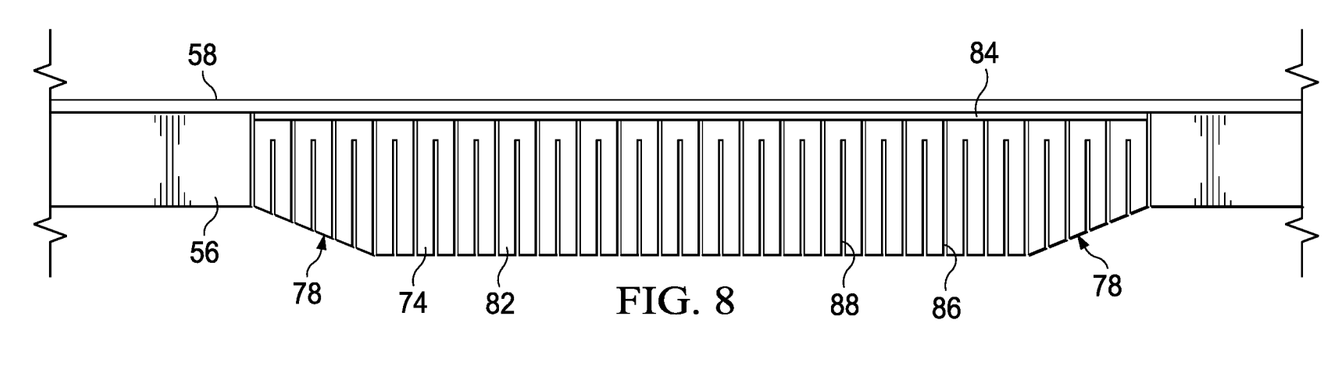
FIG. 8 is an illustration similar to FIG. 6 but showing a shim provided with openings therein that reduce stringer wrinkling during stringer contouring.
Figure 9:
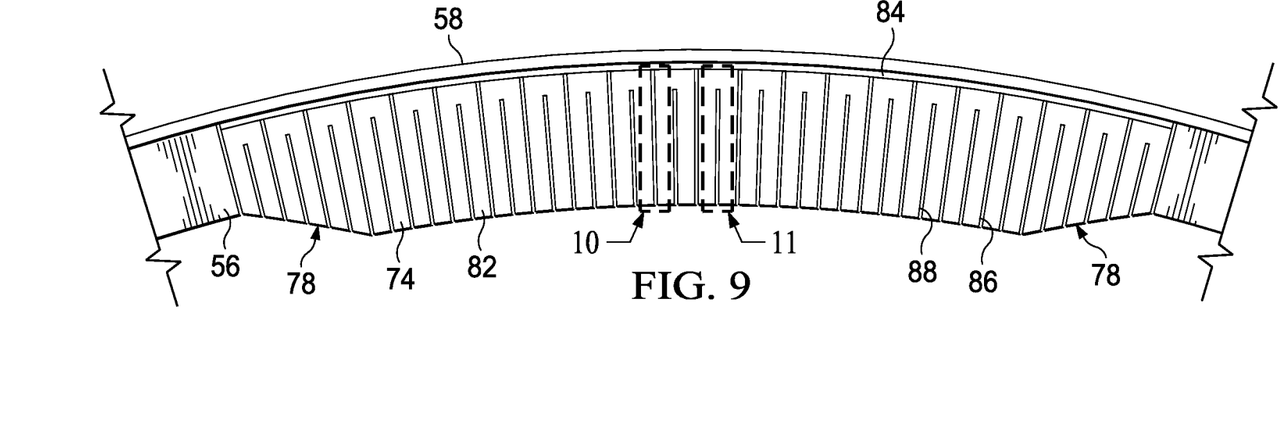
FIG. 9 is an illustration similar to FIG. 8, but showing the punch and shim having been formed to a desired contour.

In some examples, the composite stringer 30 may be formed to a desired contour along its length in a secondary forming operation, in which the punch 56, as well as the die 59, are contoured by a suitable contour changing mechanism (not shown). In order to allow the shim 74 to flex as the punch 56 is being contoured, the shim 74 is provided with a set of first openings 86 in the form of slots that extend completely across the cap 80 and sides 82 of the shim 74. Optionally, the shim 74 may further include a set of second openings 88 therein which may also be in the form of slots that extend fully across the cap 80, but only partially through the sides 82 of the shim 74. The second openings 88 reduce wrinkling or buckling of the composite stringer 30 as it is being formed the contour.

Figure 10:
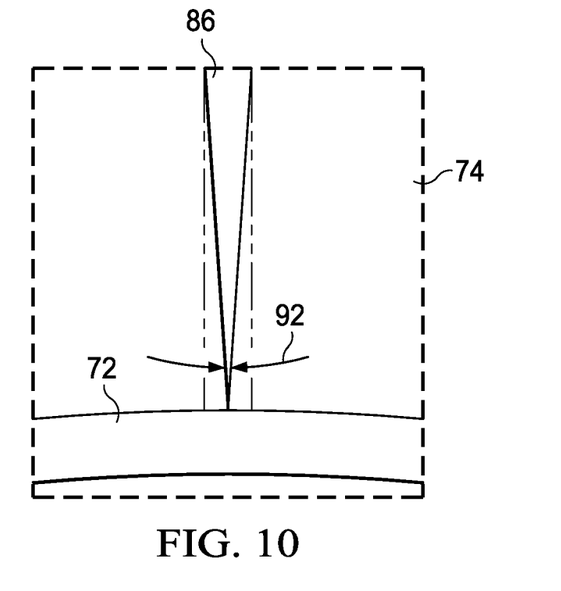
FIG. 10 is an illustration of the area designated as "10" in FIG. 9, but also showing a portion of the stringer.
Figure 11:
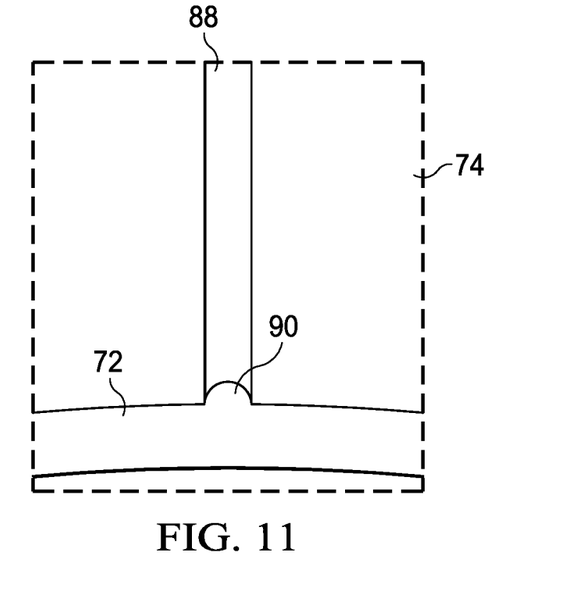
FIG. 11 is an illustration of the area designated as "11" in FIG. 9, but also showing a portion of the stringer.

Referring also to FIGS. 10 and 11, as the composite stringer 30 is being contoured, the first openings 86 may partially or fully close 92, thereby allowing the shim 74 to flex along with the punch 56. However, during this contouring, the second openings 88 remain open, allowing the composite charge 72 to strain into the second openings 88, wherein they form wrinkles 90 that that are relatively small in size and therefore do not materially affect stringer performance.

Figure 12:
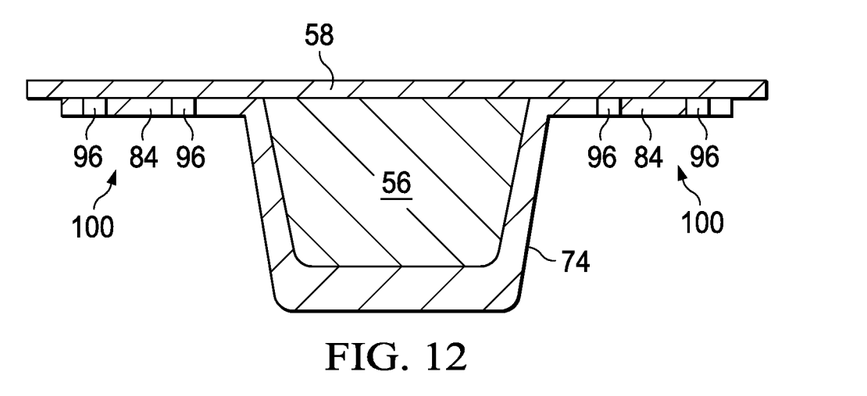
FIG. 12 is an illustration of a cross-sectional view of the punch and top plate, showing one example of magnetic attachment of the shim.

As previously mentioned, the shim 74 is releasably attached to the tool 54. The shims 74 may be releasably attached to the tool 54 using magnets 96, allowing easy installation and removal of the shims 74 to provide for various joggle locations and conditions. The use of magnets 96 also facilitates interchangeability of multiple differently configured shims 74 with a single tool. FIG. 12 illustrates one technique for shim attachment, comprising one or more magnetic latches 100, each including magnets 96 embedded in the flanges 84 of the shim 74. In this example, the top plate 58 is formed of a magnetic material, or a flexible binder material containing magnetic material. The top plate 58 is attracted to the magnets 96, thereby releasably latching the shim 74 to the tool 54.

Figure 13:
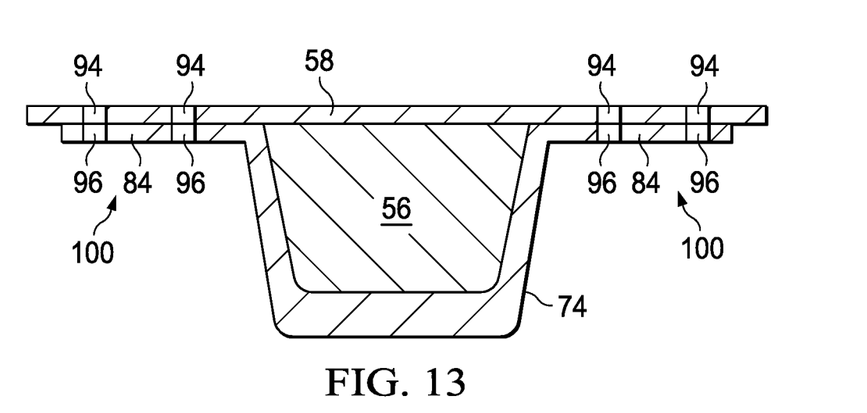
FIG. 13 is an illustration similar to FIG. 12 but showing another example of magnetic attachment of the shim.

FIG. 13 illustrates another example of a magnetic latch 100 in which magnetic material inserts 94 are embedded in the top plate 58, aligned with magnets 96 that are embedded in the flanges 84 of the shim 74.

Figure 14:
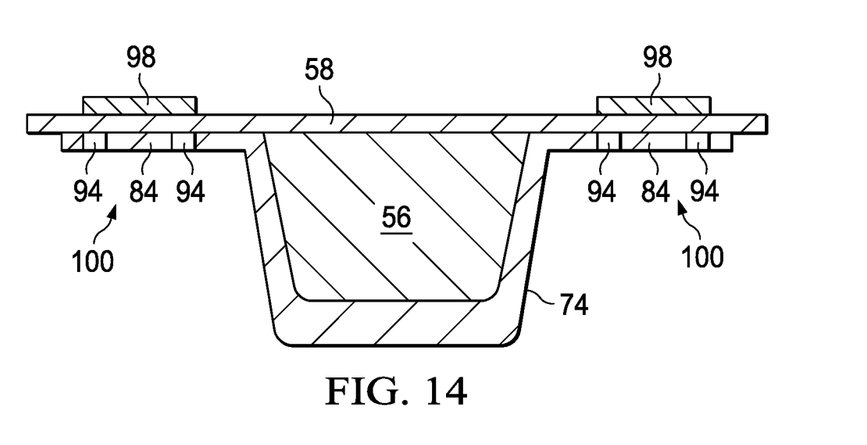
FIG. 14 is an illustration similar to FIG. 12 but showing a further example of magnetic attachment of the shim.

FIG. 14 illustrates a further example of a magnetic latch 100 in which magnetic material inserts 94 are embedded in the flanges 84 of the shim 74. Electromagnets 98 mounted on or embedded in the top plate are electrically energized to attract the magnetic material inserts 94, thereby releasably holding the shim 74 on the tool 54. Other combinations of magnets and magnetic materials may be used to magnetically attach the shim 74 to the tool 54.

Figure 15:
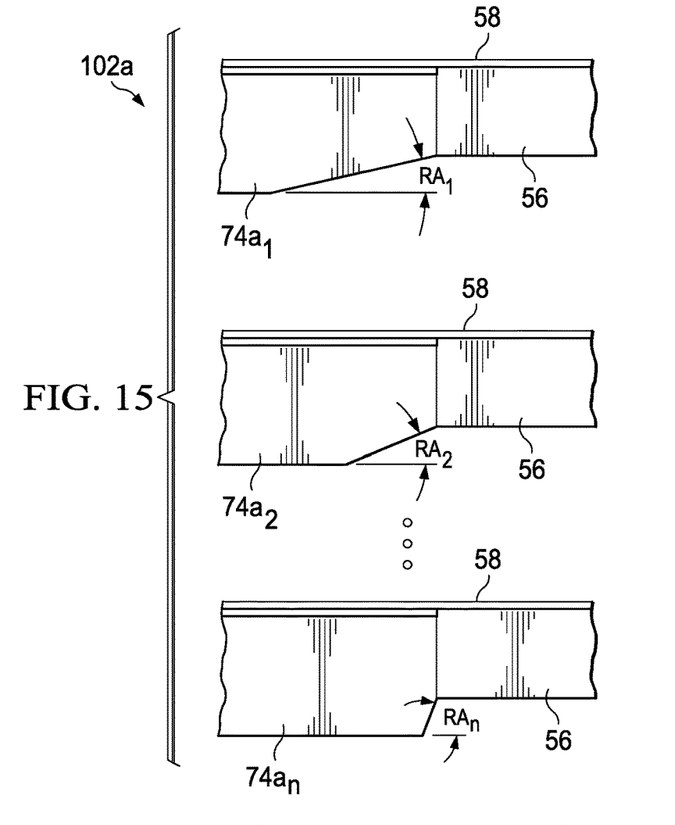
FIG. 15 is an illustration of a diagrammatic fragmentary side view of a family of shims.
Figure 16:
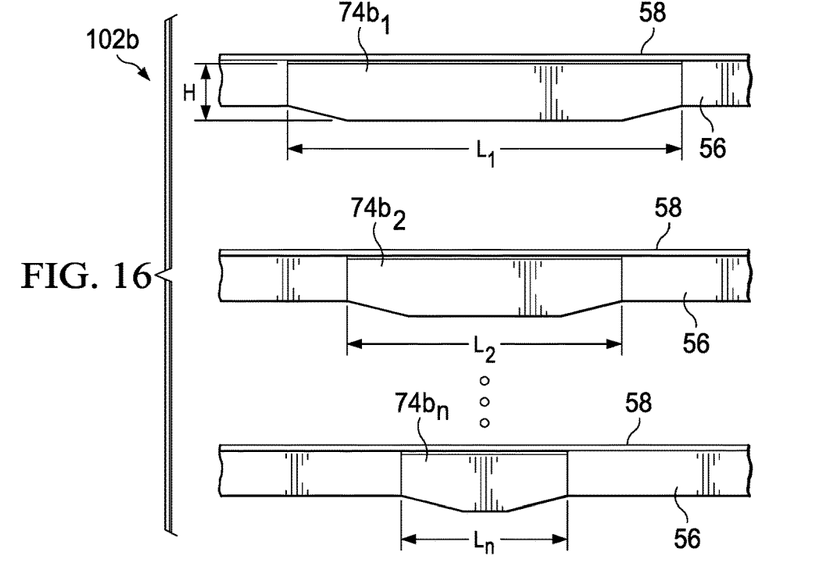
FIG. 16 is an illustration of a diagrammatic side view of another family of shims.
Figure 17:
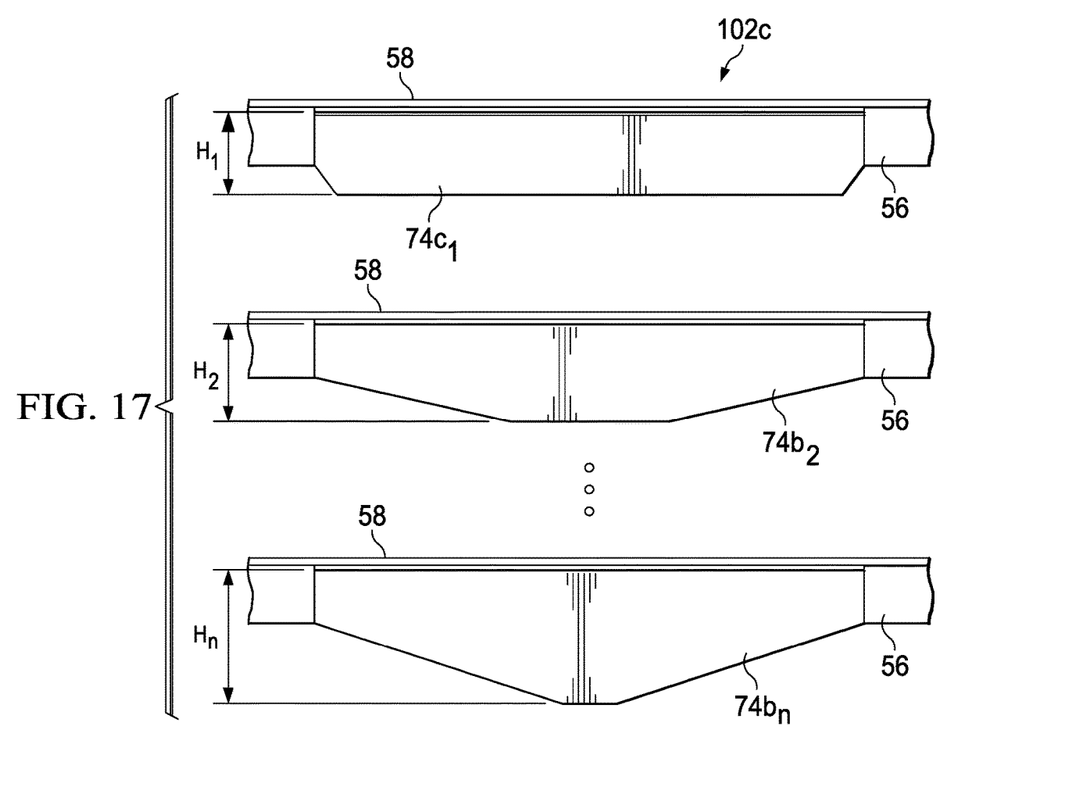
FIG. 17 is an illustration of a diagrammatic side view of a further family of shims.

Attention is now directed to FIGS. 15-17, which illustrate families 102a, 102b, 102c of shims 74 that may be used to form any of a variety of out-of-plane features such as joggles 35 in composite stringers 30. By providing one or more families 102a, 102b, 102c of shims 74 having different characteristics commonly used to form out-of-plane features, the need for custom fabrication of shims to meet the requirements of a particular application may be avoided. Shims 74 may be designed to achieve various joggle conditions used in multiple stringers 30. For example, stringers 30 with joggles 35 having ramps or heights within a certain specified range could all use the same shim 74. Thus, it may be desirable to provide a family of shims 74, each having unique characteristics, allowing a particular one of the shims 74 in a family to be selected for use in forming joggles 35 in any of number of stringers 30.

Any desired characteristic of a shim 74 may be designed to vary within a family 102a, 102b, 102c. For example, FIG. 15 illustrates a family 102a of shims 74 in which the ramp angle RA may vary either linearly or non-linearly from $RA_1$ to $RA_n$. FIG. 16 illustrates a family 102b of shims 74 in which the length of the shim 74 may vary either linearly or non-linearly from $L_1$ to $L_n$. Figure illustrates a family 102c of shims 74 in which the height of the shim 74 may vary either linearly or non-linearly from $H_1$ to $H_n$. Although not shown the Figures, families 102 of the shims 74 may also be provided that contain variations in multiple shim characteristics, for example ramp angle, length and/or height, to name only a few.

Figure 18:
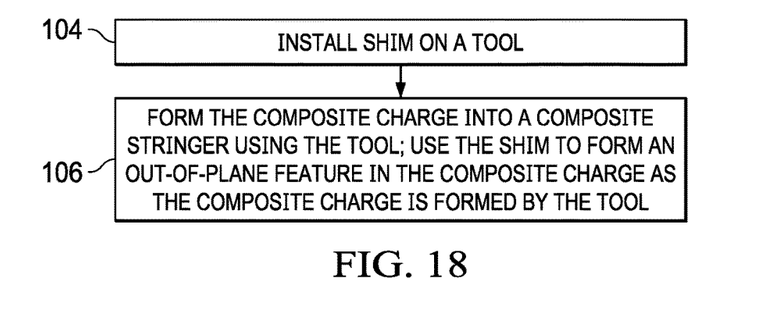
FIG. 18 is an illustration of a flow diagram of a method of making a composite stringer having an out-of-plane feature.

FIG. 18 broadly illustrates the steps of a method of making a composite stringer 30 having one or more out-of-plane features 34. Beginning at 104, a shim 74 is installed on a tool 54. At 106, a composite charge 72 is formed into a composite stringer 30 using the tool 54, including using the shim 74 to form an out-of-plane feature 34 in the composite charge 72 as a composite charge 72 is formed by the tool 54. The use of the shim 74 permits the out-of-plane feature 34 to be formed in the stringer 30 at the same time the stringer 30 is being formed, rather than later in a secondary forming operation. Simultaneous forming of the out-of-plane feature 34 and the shape of the stringer 30 reduces strain in the stringer 30, particularly in the regions of the cap 40 and sides 42 which can lead to ply wrinkling and/or resin pooling.

Figures 19, 20:
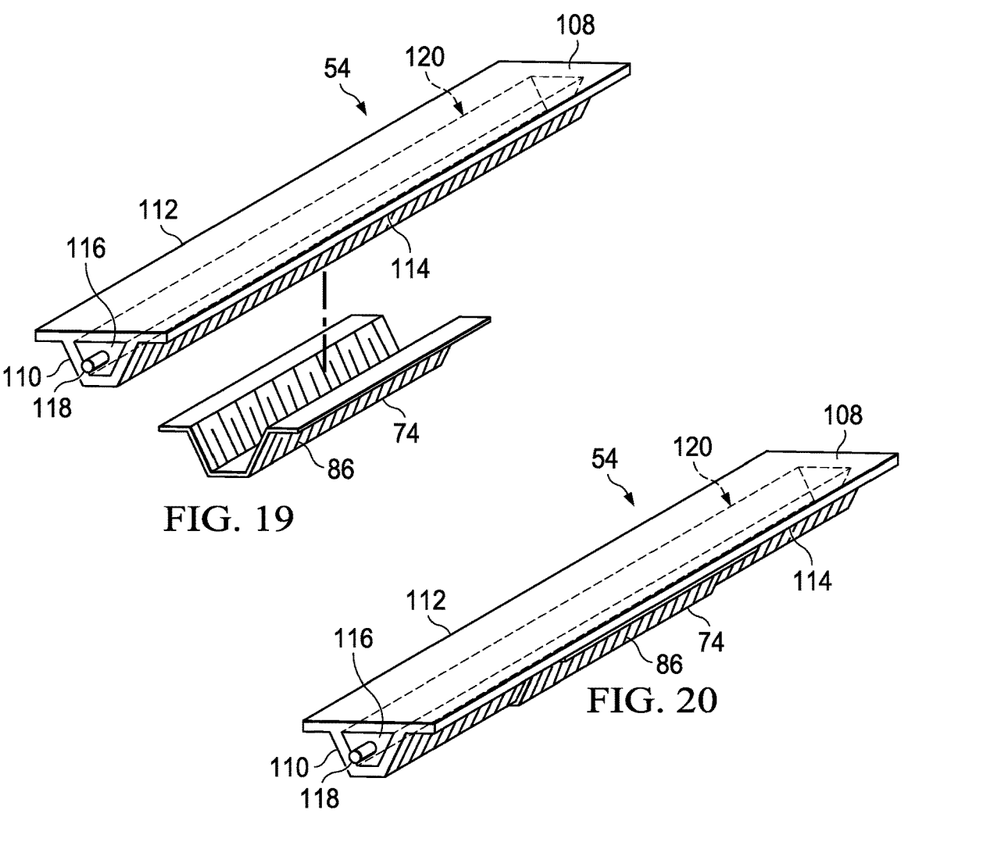
FIG. 19 is an illustration of an exploded, perspective view showing a compactor and a shim.
FIG. 20 is an illustration similar to FIG. 19 but showing the shim having been installed on the compactor.

Attention is now directed to FIGS. 19 and 20 which illustrate a tool 54 in the form of a compactor 108 that may be used to form, transport, and/or compact a composite stringer 30, which in this example is a hat stringer. The compactor 108 comprises a one-piece, hat shaped body 110 and integral flanges 112 formed of a flexible material such as an elastomer. The hat shaped body 110 includes an interior chamber 120, and a series of openings 114 which may comprise slots arranged along the length of the compactor 108. In some examples, the openings 114 may be configured to redirect stresses created in the composite charge 72 during contouring of the composite stringer 30, and thereby reduce stringer wrinkling. The compactor 108 includes an end wall 116 provided with a tube fitting 118 that is adapted to couple the interior chamber 120 with a vacuum source (not shown). A vacuum applied to the interior chamber 120 results in air being drawn in through the openings 114, producing a suction effect.

When the compactor 108 is placed inside a correspondingly shaped composite stringer 30 and a vacuum is drawn within the compactor 108, the composite stringer is drawn against the compactor 108, allowing the compactor 108 to pick up and transport the composite stringer 30 to a desired location, such as to a forming station or kitting tray (both not shown). One or more shims 74 may be attached at any location along the length of the compactor 108 in order to form and/or compact one or more out-of-plane features 34 in the composite stringer 30, similar in function to the shims 74 attached to the punch 56 previously described. The shim 74 includes openings 86 such as slots which allow air to pass through the shim 74 and be drawn into interior chamber 120 of the compactor 108.

Figure 21:
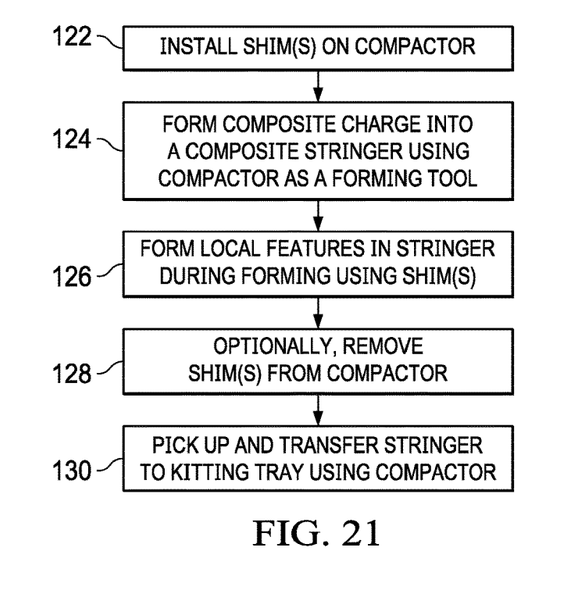
FIG. 21 is an illustration of a flow diagram of a method of making a composite stringer having an out-of-plane feature using the compactor of FIG. 19.

FIG. 21 broadly illustrates the steps of a method of forming and transporting a composite stringer 30 using the compactor 108 of FIG. 19. Beginning at 122, one or more shims 74 are installed on the compactor 108. At 124, a composite charge 72 is formed into a composite stringer 30 using the compactor 108 as a forming tool. At 126, local out-of-plane features are formed in the composite stringer 30 as the composite charge 72 is being formed, using the shim 74 that has been attached to the compactor 108. Optionally, at 128, the shim 74 may be removed from the compactor 108 after the composite charge 72 has been formed into a composite stringer 30. At 130, the compactor 108 may be used to pick up and transport the composite stringer 30 to a desired location, such to a kitting tray, a compaction tool or to a storage location.

Figure 22:
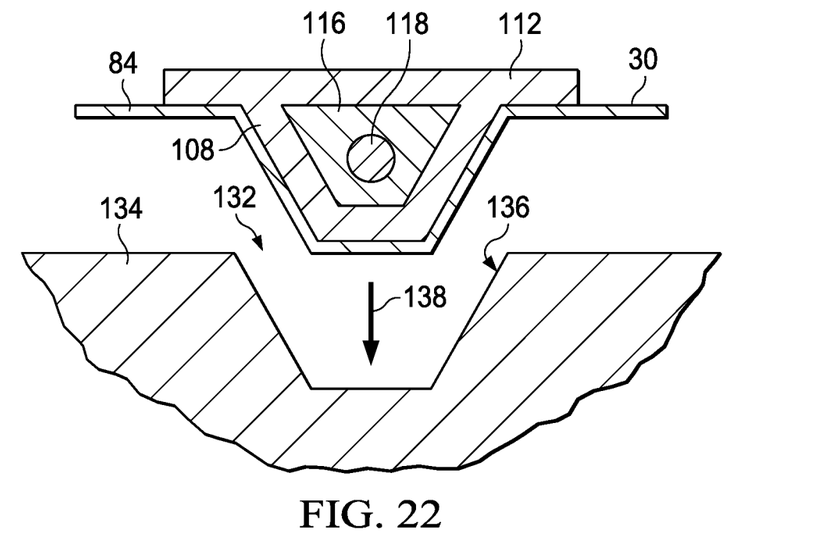
FIG. 22 is an illustration of a cross-sectional view showing a compactor about to place and form/compact a composite stringer on a die.

FIG. 22 shows the compactor 108 having picked up a composite stringer 30 using suction drawn through the openings 114 (FIG. 19) and about to lower 138 the composite stringer 30 into a die cavity 132 in a forming die 134. The forming die 134 includes a die surface 136 that is contoured along its length. After placing the composite stringer 30 in the die cavity 132, forming pressure is applied to the compactor 108, causing the composite stringer 30 to be formed to the contour of the die cavity 132. Additionally, the shim 74 forms-out-of plane features in the composite stringer 30 during this contour forming process. Additional pressure applied to the compactor 108 by any suitable means such as a vacuum bag (not shown) results in compaction of the composite stringer on the forming die 134.

Figure 23:
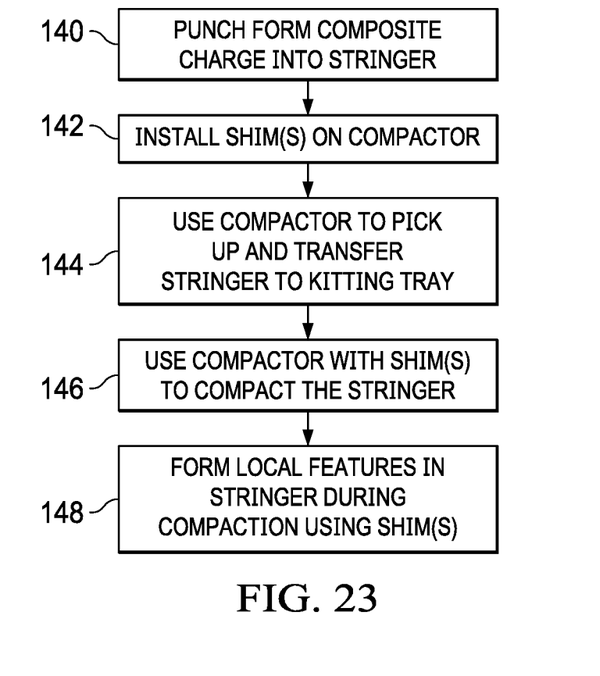
FIG. 23 is an illustration of a flow diagram of a method of making a composite stringer containing local out-of-plane features using a compactor to transport and form/compact the composite stringer.

FIG. 23 broadly illustrates the steps of a method of compacting and/or forming a composite stringer 30 to a desired contour which includes one or more out-of-plane features 34. Beginning at 140, a composite charge 72 is punch formed into a composite stringer 30 having a desired cross-sectional shape. Next, at 142 one or more shims 74 are installed on a compactor 108. At 144, the compactor 108 is used to pick up and transfer the composite stringer 30 a forming die 134 or kitting tray. At 146, the compactor 108 having the shim 74 installed thereon is used to form and/or compact the composite stringer 30. At 148, local out-of-plane features are formed in the composite stringer 30 during the forming/compaction using the shim 74.

Figure 24:
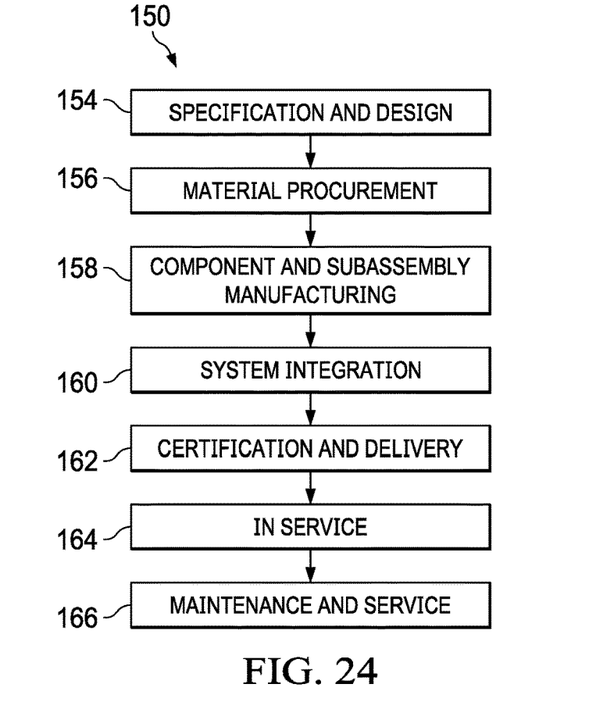
FIG. 24 is an illustration of a flow diagram of aircraft production and service methodology.
Figure 25:
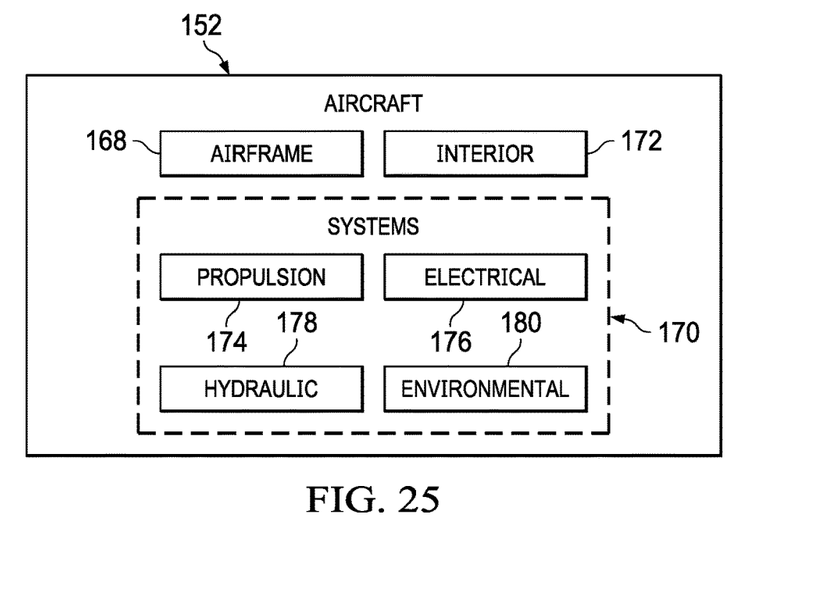
FIG. 25 is an illustration of a block diagram of an aircraft.

Examples of the disclosure may find use in a variety of potential applications, particularly in the transportation industry, including for example, aerospace, marine, automotive applications and other application where composite stiffeners, such as composite stringers in aircraft, may be used. Thus, referring now to FIGS. 24 and 25, examples of the disclosure may be used in the context of an aircraft manufacturing and service method 150 as shown in FIG. 24 and an aircraft when 152 as shown in FIG. 25. Aircraft applications of the disclosed examples may include a variety of composite stringers that have contours, curvatures, varying thicknesses and/or one or more out-of-the plane features along their lengths. During pre-production, exemplary method 150 may include specification and design 154 of the aircraft 152 and material procurement 156. During production, component and subassembly manufacturing 158 and system integration 160 of the aircraft 152 takes place. Thereafter, the aircraft 152 may go through certification and delivery 162 in order to be placed in service 164. While in service by a customer, the aircraft 152 is scheduled for routine maintenance and service 166, which may also include modification, reconfiguration, refurbishment, and so on.

Each of the processes of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 152 produced by exemplary method 150 may include an airframe 168 with a plurality of systems 170 and an interior 174. Examples of high-level systems 170 include one or more of a propulsion system 174, an electrical system 176, a hydraulic system 178 and an environmental system 180. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 150. For example, components or subassemblies corresponding to production process 158 may be fabricated or manufactured in a manner similar to components or subassemblies produced while the aircraft 152 is in service. Also, one or more apparatus examples, method examples, or a combination thereof may be utilized during the production processes 158 and 160, for example, by substantially expediting assembly of or reducing the cost of an aircraft 152. Similarly, one or more of apparatus examples, method examples, or a combination thereof may be utilized while the aircraft 152 is in service, for example and without limitation, to maintenance and service 166.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:
1. Apparatus for making a composite stringer having at least one out-of-plane feature, comprising:
   a die including a die cavity;
   a tool configured to form a composite charge into the die cavity;

a shim attached to the tool and configured to form an out-of-plane feature in the composite stringer in the form of a joggle along a length of the composite stringer as the tool forms the composite charge into the die cavity, wherein the shim has a cross-sectional profile that matches a cross-sectional shape of the tool and wherein the cross-sectional profile of the shim matches a cross-sectional shape of the out-of-plane feature; and wherein the shim includes:
a cap, sides, and flanges which form the cross-sectional profile of the shim;
a set of first openings therein that extend completely across the cap and the sides allowing the shim to flex; and
a set of second openings therein that extend fully across the cap but only partially through the sides into which the composite charge may strain as the composite charge is formed by the tool.

2. The apparatus of claim 1, wherein the tool is a punch having a cross sectional profile matching a cross sectional profile of the composite stringer.

3. The apparatus of claim 1, wherein the tool is a compactor configured to compact the composite stringer.

4. The apparatus of claim 1, wherein:
the tool has a length and,
the shim extends continuously transversely across the tool and is configured to modify an outer profile of the tool along a portion of the length of the tool.

5. The apparatus of claim 1, wherein the joggle in the composite stringer includes a ramp up and a ramp down in the cross-sectional profile of the shim along a length of the shim.

6. The apparatus of claim 1, wherein the composite stringer is a hat stringer and the shim includes a pair of flanges and a hat section covering the tool along a portion of a length of the tool.

7. The apparatus of claim 1, wherein
each opening of the set of first openings
is alternately positioned between each opening of the set of second openings along a length of the shim.

8. The apparatus of claim 1, further comprising a magnetic latch configured to releasably attach the shim to the tool.

9. The apparatus of claim 8, wherein the magnetic latch includes:
at least one magnet mounted on one of the tool and the shim, and
an element formed of magnetic material mounted on an other of the tool and the shim and configured to be magnetically attracted to the magnet.

10. Apparatus for making a composite stringer, comprising:
a punch;
a die into which a composite charge may be formed by the punch;
a family of shims respectively configured to form differing features in the composite charge along a length of the composite charge, wherein each shim of the family of shims has a cross-sectional profile that matches a cross-sectional shape of the punch and wherein the cross-sectional profile of each shim matches a cross-sectional shape of a respective feature of the differing features;
each shim of the family of shims being configured to be releasably attached to the punch; and
wherein at least one shim of the family of shims includes:
a cap, sides, and flanges which form the cross-sectional profile of the shim;
a set of first openings therein that extend completely across the cap and the sides allowing the shim to flex; and
a set of second openings therein that extend fully across the cap but only partially through the sides.

11. The apparatus of claim 10, wherein:
each shim of the family of shims includes a length, a height, and a ramp having a ramp angle, and each shim of the family of shims differ from each other in at least one of the length, the height, and the ramp angle.

12. The apparatus of claim 10, wherein
each opening of the set of first openings
is alternately positioned between each opening of the set of second openings.

13. The apparatus of claim 10, wherein at least certain of the differing features is a joggle in the composite stringer.

14. The apparatus of claim 10, wherein the composite stringer has a hat shaped cross section and each cross-sectional profile of each shim of the family of shims matches the hat shaped cross section.

15. A method of making a composite stringer having an out-of-plane feature to net shape, comprising:
forming a die cavity in a die;
installing a shim on a tool, the shim configured to form an out-of-plane feature along a length of a composite stringer, wherein the shim includes a cap, sides, and flanges which form a cross-sectional profile of the shim;
forming a composite charge into the die cavity and forming the composite stringer using the tool, including using the shim to form the out-of-plane feature in the composite charge as the composite charge is formed by the tool, wherein the cross-sectional profile of the shim matches a cross-sectional shape of the tool and wherein the cross-sectional profile of the shim matches a cross-sectional shape of the out-of-plane feature; and
forming a plurality of first openings in the shim that extend completely across the cap and the sides and forming a plurality of second openings in the shim that extend fully across the cap but only partially through the sides.

16. The method of claim 15, wherein installing the shim includes magnetically attaching the shim to the tool.

17. The method of claim 15, wherein forming the composite charge into a composite stringer includes punching the composite charge into the die cavity.

18. The method of claim 15, further comprising:
contouring the composite stringer, including flexing the shim.

19. The method of claim 15, further comprising:
picking up and transporting the composite stringer using the tool.

20. The method of claim 19, further comprising:
compacting the composite stringer using the tool after the transporting.

* * * * *